United States Patent [19]

Pittman

[11] Patent Number: 4,715,227
[45] Date of Patent: Dec. 29, 1987

[54] MULTISENSOR ASSEMBLY WITH ANGULAR RATE PIEZOELECTRIC CRYSTAL BEAM

[75] Inventor: Roland Pittman, Montclair, N.J.

[73] Assignee: The Singer Company, Stamford, Conn.

[21] Appl. No.: 902,695

[22] Filed: Sep. 2, 1986

[51] Int. Cl.⁴ .............................................. G01P 9/02
[52] U.S. Cl. ...................................... 73/504; 73/510; 73/DIG. 4; 310/353
[58] Field of Search .................. 73/504, 510, DIG. 4; 74/5 F, 5.6 D; 310/329, 330, 353

[56] References Cited

U.S. PATENT DOCUMENTS 3,464,259 9/1969 Farr .................................. 73/862.35
4,621,529 11/1986 Pittman .................................. 73/504

OTHER PUBLICATIONS

E. C. Thompson, "Double Mount for Each Electrode of a Crystal to Prevent Failure," Western Electric Technical Digest, No. 26, (Apr. 1972), pp. 59-60.

Primary Examiner—John Chapman
Attorney, Agent, or Firm—David L. Davis

[57] ABSTRACT

In a multisensor assembly for detecting angular rates and linear accelerations, a diamond-shaped piezoelectric crystal beam is used to restrain a gyroscopic element to a base of the multisensor assembly. The diamond-shaped piezoelectric crystal is fixed to both the gyroscopic element and the base of the assembly by means of wires in an orientation orthogonal to the hinge axis and the spin axis of the assembly. This allows the piezoelectric crystal to experience only one degree of freedom. To improve the accuracy of the output electrical signal, oblong electrodes are placed on opposite surfaces of the piezoelectric crystal beam.

13 Claims, 5 Drawing Figures

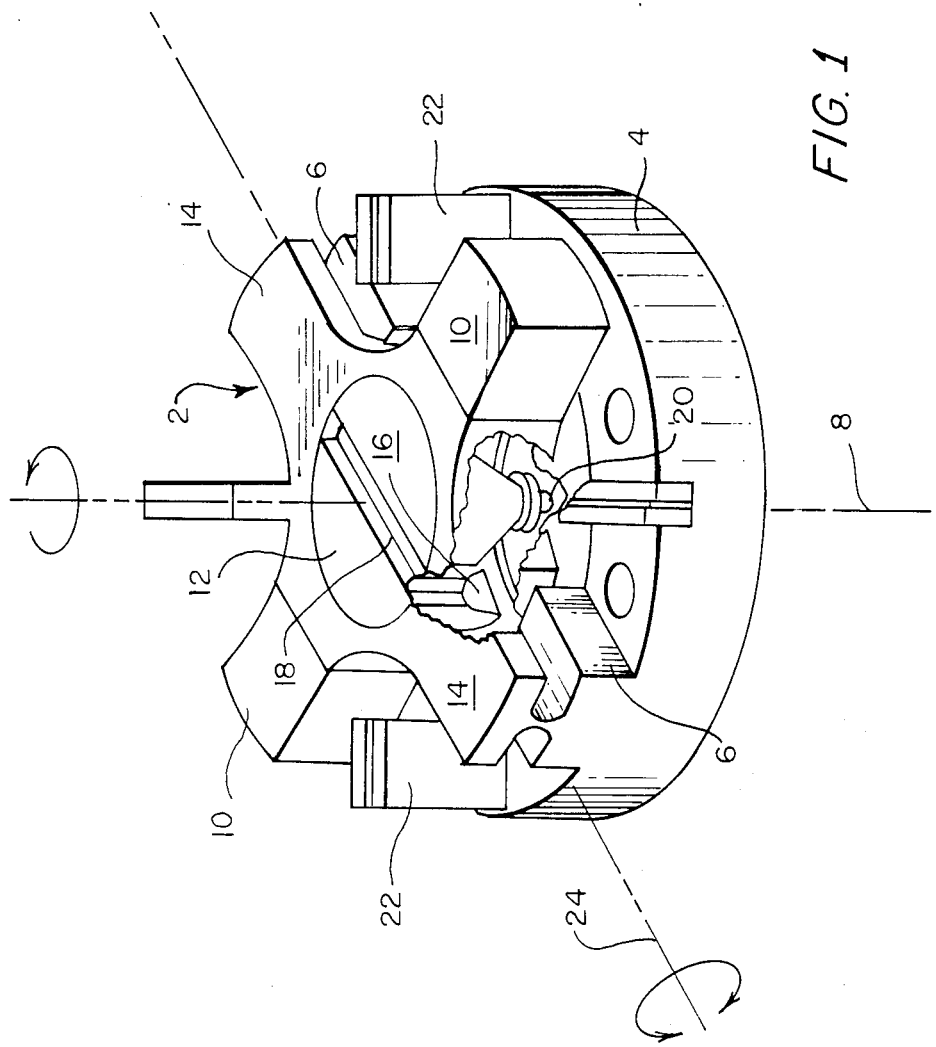

MULTISENSOR ASSEMBLY WITH ANGULAR RATE PIEZOELECTRIC CRYSTAL BEAM

FIELD OF THE INVENTION

The present invention relates to a gyroscopic multisensor assembly, and more particularly to an improved torque sensing assembly for enhancing the performance of the multisensor assembly.

BACKGROUND OF THE INVENTION

As was noted in copending application Ser. No. 745,055, now U.S. Pat. No. 4,621,529, by the inventor of the present application and assigned to the same assignee, conventional guidance systems for aircraft and missiles use multisensor assemblies for sensing angular rates about some axis perpendicular to the spin bearing axis of the device. A multisensor assembly includes a gyroscopic element restrained by a piezoelectric crystal beam to a base of the assembly. As is well known, a mechanical distortion of a piezoelectric crystal beam would produce a corresponding electrical signal. Thus, for a multisensor assembly, by appropriately restraining the gyroscopic element to the base via a piezoelectric crystal beam, an angular rate of the gyroscopic element—in relation to the base—can be ascertained from the electrical signal generated by the piezoelectric beam. As was discussed in the aforesaid copending application, restrained piezoelectric crystal beams may also be used for determining linear accelerations along any axis perpendicular to the spin bearing axis of the multisensor assembly.

In the copending application, the piezoelectric crystal beam used to restrain the gyroscopic element to the base of the multisensor assembly has the shape of a trapezoid. This trapezoidal piezoelectric crystal beam is held by two clamps to the gyroscopic element and the base of the multisensor assembly.

Insofar as the operation of the multisensor is concerned, the trapezoidal beam does impart a restraining torque to the gyroscopic element. However, from repeated usage, it was found that there are two problems associated with the use of the trapezoidal piezoelectric crystal beam in a multisensor assembly. The first problem arose due to the fact that the clamps and the piezoelectric crystal have different coefficients of expansion, thereby causing a mismatch to exist between the two different materials. Consequently, the piezoelectric beam tends to crack. The second problem found is that vibrations from the spindles and the bearings of the multisensor assembly are transmitted to the gyroscopic element. These vibrations are in turn transmitted to the piezoelectric crystal beam. Consequently, a relatively large amount of noise which places a limit on the performance of the multisensor assembly is present in the copending application device.

BRIEF DESCRIPTION OF THE PRESENT INVENTION

The present invention improves the operation of the copending application device by replacing the trapezoidal piezoelectric beam with a diamond-shaped beam. In addition, tungsten wires are used to fix the diamond-shaped piezoelectric beam to the gyroscopic element and the base of the multisensor. Furthermore, oblong electrodes are added to opposite surfaces of the diamond-shaped beam.

By utilizing a differently shaped piezoelectric beam and by mounting it truss-like to the gyroscopic element and the base, vibrations from the spindles and the bearings are substantially reduced, thereby leading to a hundred-fold performance improvement over the copending application device. Also, by adding the oblong electrodes, the readings obtained from the piezoelectric beam tend to be more accurate.

The above-mentioned objects and advantages of the present invention will be more clearly understood when considered in conjunction with the accompanying drawings, in which:

BRIEF DESCRIPTION OF THE FIGURES

FIG. 1 is a partially cut away perspective view of a multisensor assembly having a trapezoidal piezoelectric crystal beam;

DETAILED DESCRIPTION OF THE INVENTION

Figure 2A:
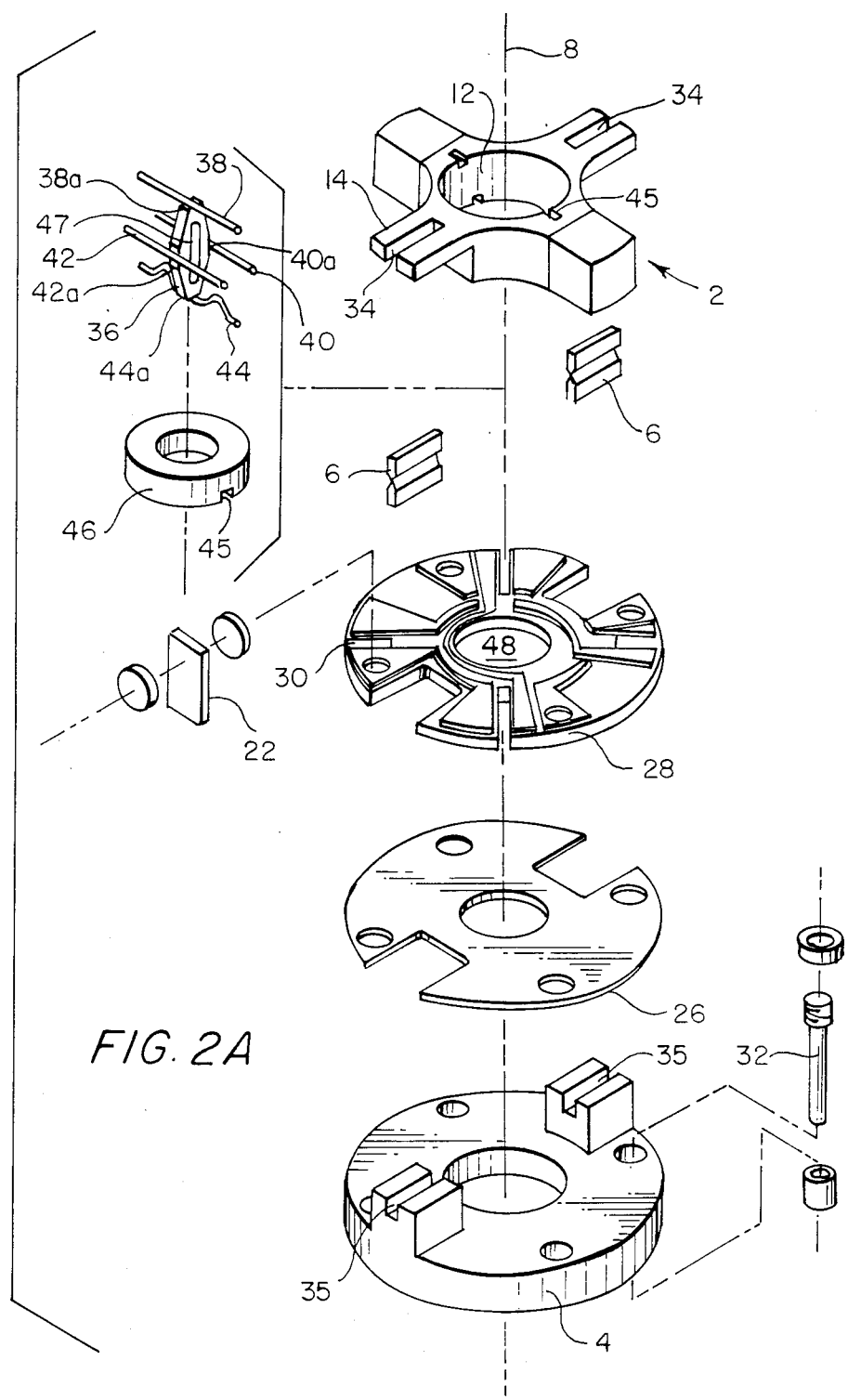
FIG. 2A is a disassembled view of a multisensor assembly constructed in accordance with the present invention.

FIG. 1 shows a multisensor assembly, otherwise known as a pickoff rate-accelerometer assembly, described and claimed in copending application Ser. No. 745,055, now U.S. Pat. No. 4,621,529. For the sake of clarity, the more mundane features of the FIG. 1 assembly, which were shown and described in the aforesaid copending application, have been deleted herein. As shown, the FIG. 1 multisensor assembly includes a gyroscopic element 2 connected to a base 4 by means of flexure hinges 6. Gyroscopic element 2 rotates about a spin axis 8 and has arms 10 extending diametrically outwardly from a centrally formed aperture 12. Diametrically extending arms 14 orthogonal to arms 10 receive flexure hinges 6 for resiliently supporting gyroscopic element 2 on top of base 4. A pair of restraining members 16 is used to clamp the top portion of a trapezoidal-shaped piezoelectric beam 18 within aperture 12. The lower apex portion of piezoelectric beam 18 is received by a receptacle 20, which in turn is received within base 4 for supporting piezoelectric beam 18. Also shown are four uniformly spaced piezoelectric crystal beams 22 received in base 4 for generating electrical signals proportional to the linear acceleration of the multisensor assembly along axes perpendicular to spin axis 8.

As is shown, the trapezoidal piezoelectric beam is aligned along a hinge axis 24 which is orthogonal to spin axis 8. Thus, the gyroscopic element is restrained mechanically by trapezoidal piezoelectric beam 18 such that both end supports are aligned with bearing spin axis 8. Accordingly, in reaction to an angular velocity, the gyroscopic element mechanically strains piezoelectric beam 18, which in turn produces an output electrical signal proportional to the angular velocity applied to the gyroscopic element.

As long as the ambient temperature is kept within a narrow range to prevent the crystal beam from cracking and external vibrations such as from the bearings and the spindles are kept to a minimum, the FIG. 1 device works adequately. However, in order to effectively isolate the external vibrations, prevent the crystal beam from cracking and provide for much more accurate readings, the multisensor assembly, as shown in FIGS. 2A to 2C is needed.

Figure 2B:
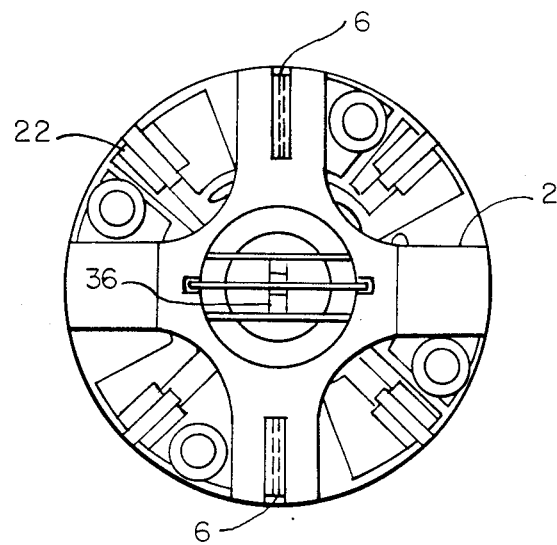
FIG. 2B is a top plan view of the assembly illustrated in FIG. 2A.
Figure 2C:
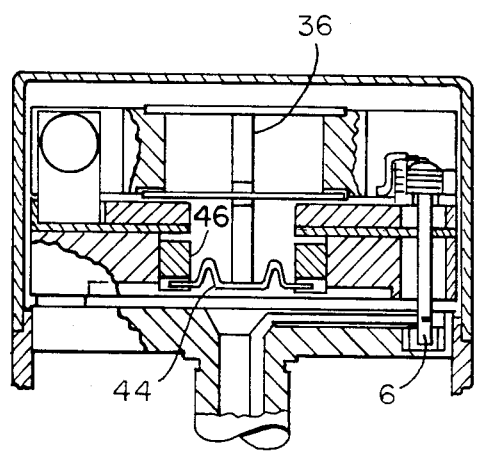
FIG. 2C is a partial cross-sectional view of the assembly illustrated in FIG. 2A.

Referring to FIG. 2A, there is shown a disassembled view of the multisensor assembly of the present invention. To keep things simple, elements in the FIGS. 2A-2C assembly which are the same as those of the FIG. 1 apparatus are similarly numbered.

FIG. 2A shows a template 26 and a circuit board and accelerator beam support 28 superposed over base 4. A representative piezoelectric accelerometer beam 22 (of which there are four) is received in base slot 30 of support 28. To bolt base 4 onto a platform (not shown) a representative bolt 32 is used. Similar to the FIG. 1 assembly, flexure hinges 6 are used to mount a gyroscopic element 2 to base 4 by means of diametrically opposed slots 34 and 35 on arms 14 of gyroscopic element 2 and base 4, respectively.

To restrain gyroscopic element 2, the present invention uses a diamond-shaped piezoelectric crystal beam 36 having four wires fixed to the four corners thereof. As shown, each corner of the diamond-shaped beam has been flattened out so that the respective wires can be better secured to these four corners. For this embodiment, three straight wires 38, 40 and 42 are secured to respective top apex portion 38A and side portions 40A and 42A of crystal beam 36. The lower portion 44A of the piezoelectric beam is fixed to a wire 44 having an arcuate curve, i.e. kink, on respective sides of the piezoelectric beam. A conventional way of fixing the wires to the diamond-shaped piezoelectric beam is by means of using readily available epoxy glue. The thus "wired" piezoelectric beam is then fixed by means of the wires to notches 45 shown in gyroscopic element 2 and ring 46, which is inserted into opening 48 of support 28. For this embodiment, the wires are made from tungsten, which has a coefficient of expansion similar to that of the piezoelectric crystal and which is nonmagnetic and therefore amenable to making good adhesive joints with the piezoelectric crystal.

As shown in FIGS. 2B and 2C, the piezoelectric beam, when placed within aperture 12 of gyroscopic element 2 and opening 48 of beam support 28, appears to float in a stressless-like truss suspension within the cavity created by aperture 12 and opening 48. The piezoelectric beam is in fact connected by the wires, which act as sway bars, thereby isolating external vibrations along the length of the crystal beam. Putting it another way, the piezoelectric crystal beam has vibration isolation in all five degrees of freedom and it is restrained in only one degree of freedom; that is, the bending axis, i.e. axis 8, of the piezoelectric crystal itself. This positioning of the piezoelectric beam presents an ideal situation since the crystal restrains the gyroscopic element without interacting in any other way with any other portion of the gyroscopic element or the base. It should be appreciated that the wire which is used to fix lower portion 44A of the piezoelectric beam to ring 46 need not have kinks as shown by wire 44, as a straight wire (shown in FIG. 3) may also be used. The reason that a wire having kinks thereon is shown is that the frequency of the multisensor assembly may be adjusted by changing the diameter of the wire over a small range and also by the shape of the wire. However, irrespective of the shape of this wire, its function remains that of a sway bar.

Figure 3:
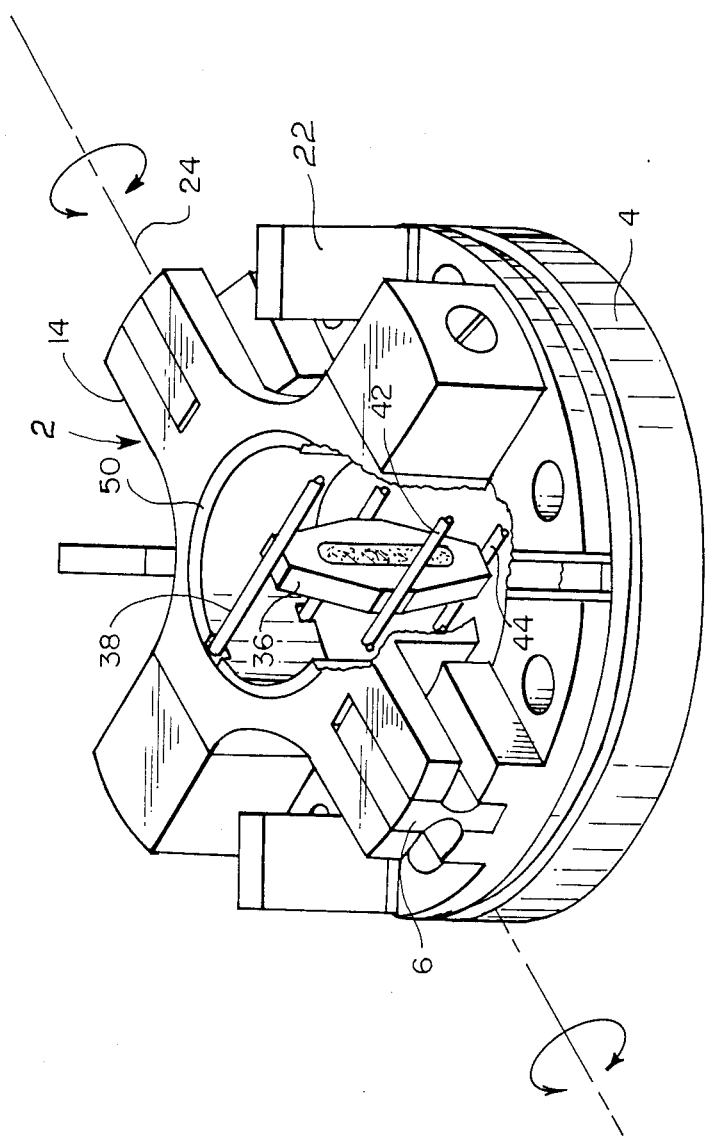
FIG. 3 is a partially cut away perspective view of an assembled multisensor assembly of the present invention.

As can be seen in FIGS. 2A and 3, on both sides of piezoelectric crystal beam 36 are oblong electrode areas 47. These electrode areas tend to further confine and reduce the unwanted parasitic defects, i.e. nonlinearities, the piezoelectric crystal may get from the wires as the active electrode areas are isolated completely from the piezoelectric crystal-wire joints. Also, by having oblong areas oriented in a coaxial relationship with spin axis 8, the fact that the piezoelectric crystal is affected only in one degree of freedom and vibration isolated in the other directions is further enhanced. The use of both a diamond-shaped piezoelectric crystal and oblong electrode areas on opposite surfaces thereof results in improving the operation of the multisensor by a hundred fold. The wires for this embodiment, as was mentioned previously, have a coefficient of expansion similar to the piezoelectric crystal and the piezoelectric crystal may be a bimorph, the method of making which is conventional.

FIG. 3 shows a partially cut away perspective view of an assembled multisensor assembly of the present invention. As shown, wire 44 is straight. And the orientation of the wires is orthogonal to axis 24, which is aligned with flexure hinges 6.

In operation, an angular velocity about some axis perpendicular to spin axis 8 is sensed by gyroscopic element 2. Since the gyroscopic element is mechanically restrained by the diamond-shaped piezoelectric beam, which is algined along spin axis 8, the only degree of freedom the piezoelectric beam may have is in a direction in coaxial relationship with the axis of the wires. And any reaction by the gyroscopic element to an angular velocity would mechanically strain the piezoelectric crystal beam, thereby causing the latter to produce an electrical signal proportional to the angular velocity sensed by the former.

By shaping the piezoelectric crystal beam in the form of a diamond, the parasitic infringing effect of the wires fixing the piezoelectric beam to the gyroscopic element and the base of the assembly is substantially reduced. By empirical studies, a diamond-shaped piezoelectric crystal would be more immune to vibrations along an axis orthogonal to the longitudinal axis of the oblong electrode areas. Furthermore, the oblong electrode would cause the stress applied to the piezoelectric crystal to be evenly distributed along the active electrode area, thereby providing for equal potential output all along the length of the electrodes, which provides for a more linear output signal.

To be noted in FIG. 3 is that since the piezoelectric crystal is held only by means of the wires—in this case made up of tungsten which has a coefficient of expansion very similar to that of the piezoelectric crystal—the piezoelectric crystal would no longer be subjected to stress and subsequent cracking, as was the case for the piezoelectric crystal which was held by clamps. Also to be noted in FIG. 3 is the fact that the piezoelectric crystal is first attached by the wires to a cylindrical tube 50 and a base ring 46 (shown in FIG. 2A). Cylindrical tube 50 and ring 46, after having the piezoelectric beam fixed thereto, are inserted into the circular cavity formed by aperture 12 of gyroscopic element 2 and opening 48 of beam support 28. Of course, the cylindrical tube and the ring are glued to the gyroscopic element and the support base, respectively, thereafter.

Insofar as the present invention is subject to many variations, modifications and changes in detail, it is intended that all matter described throughout this specification and shown in the accompanying drawings be interpreted as illustrative and not in a limiting sense. Accordingly, it is intended that the invention be limited only by the spirit and scope of the appended claims.

I claim:

1. In a navigation sensor having a gyroscopic element rotatable about an axis and at least one flexure hinge for resiliently mounting the gyroscopic element to a base, the gyroscopic element including an aperture concentric to the axis, the navigation sensor further having a torque sensing assembly comprising:
   a piezoelectric beam aligned in coaxial relationship with the axis;
   first restraining means for fixing orthogonal to the axis one edge portion of the beam to the gyroscopic element;
   second restraining means for fixing orthogonal to the axis an opposite edge portion of the beam to the base;
   third restraining means intermediate to the first and second restraining means for fixing to the gyroscopic element opposite midsection portions of the beam orthogonal to the axis;
   whereby the restrained beam converts an angular rate of the gyroscopic element to a corresponding electrical signal.

2. The torque sensing assembly according to claim 1, wherein the first restraining means fixes the one edge portion of the piezoelectric beam to the inner circumferential edge of the aperture of the gyroscopic element and the third restraining means fixes the opposite midsection portions of the piezoelectric beam to the bottom inner circumferential edge of the gyroscopic element, the first and third restraining means fixing the piezoelectric beam within the aperture of the gyroscopic element.

3. The torque sensing assembly according to claim 1, wherein the piezoelectric beam is diamond-shaped.

4. The torque sensing assembly according to claim 1, wherein all the restraining means comprise wires having coefficients of expansion similar to that of the piezoelectric beam.

5. The torque sensing assembly according to claim 3, wherein the piezoelectric beam has on opposite surfaces thereof oblong electrode areas.

6. The torque sensing assembly according to claim 4, wherein the wires for fixing the piezoelectric beam to the gyroscopic element and the base are coaxially aligned in a direction orthogonal to the longitudinal axis of the flexure hinges.

7. The torque sensing assembly according to claim 4, wherein all of the wires are straight.

8. The torque sensing assembly according to claim 4, wherein the wire for fixing the one edge portion of the beam to the base has at least one kink and wherein the remaining wires are straight.

9. A navigation sensor comprising:
   a gyroscopic element rotatable about an axis, the gyroscopic element having an aperture concentric to the axis;
   a base;
   at least one flexure hinge for resiliently mounting the gyroscopic element to the base;
   a torque sensing assembly engaged to the gyroscopic element and the base, the torque sensing assembly including:
   (a) a first piezoelectric beam aligned in coaxial relationship with the axis;
   (b) first restraining means for fixing orthogonal to the axis one edge portion of the beam to the gyroscopic element;
   (c) second restraining means for fixing orthogonal to the axis an opposite edge portion of the beam to the base; and
   (d) third restraining means intermediate to the first and second restraining means for fixing to the gyroscopic element opposite midsection portions of the beam orthogonal to the axis;
   whereby the first restrained beam converts an angular rate of the gyroscopic element to a first corresponding electrical signal; and
   second piezoelectric beams mounted in uniform spaced relation to the axis for generating a second electric signal proportional to a linear acceleration of the sensor in a direction perpendicular to the axis.

10. The sensor according to claim 9, wherein the first piezoelectric beam is diamond-shaped.

11. The sensor according to claim 10, wherein the first piezoelectric beam has on opposite surfaces thereof oblong electrodes.

12. The sensor according to claim 9, wherein all the restraining means comprise wires having coefficients of expansion similar to that of the first piezoelectric beam.

13. The sensor according the claim 10, wherein the second restraining means comprises a wire having at least one kink.

* * * * *